J. K. DUKAS.
FISHING NET.
APPLICATION FILED AUG. 10, 1920.
1,430,221. Patented Sept. 26, 1922.
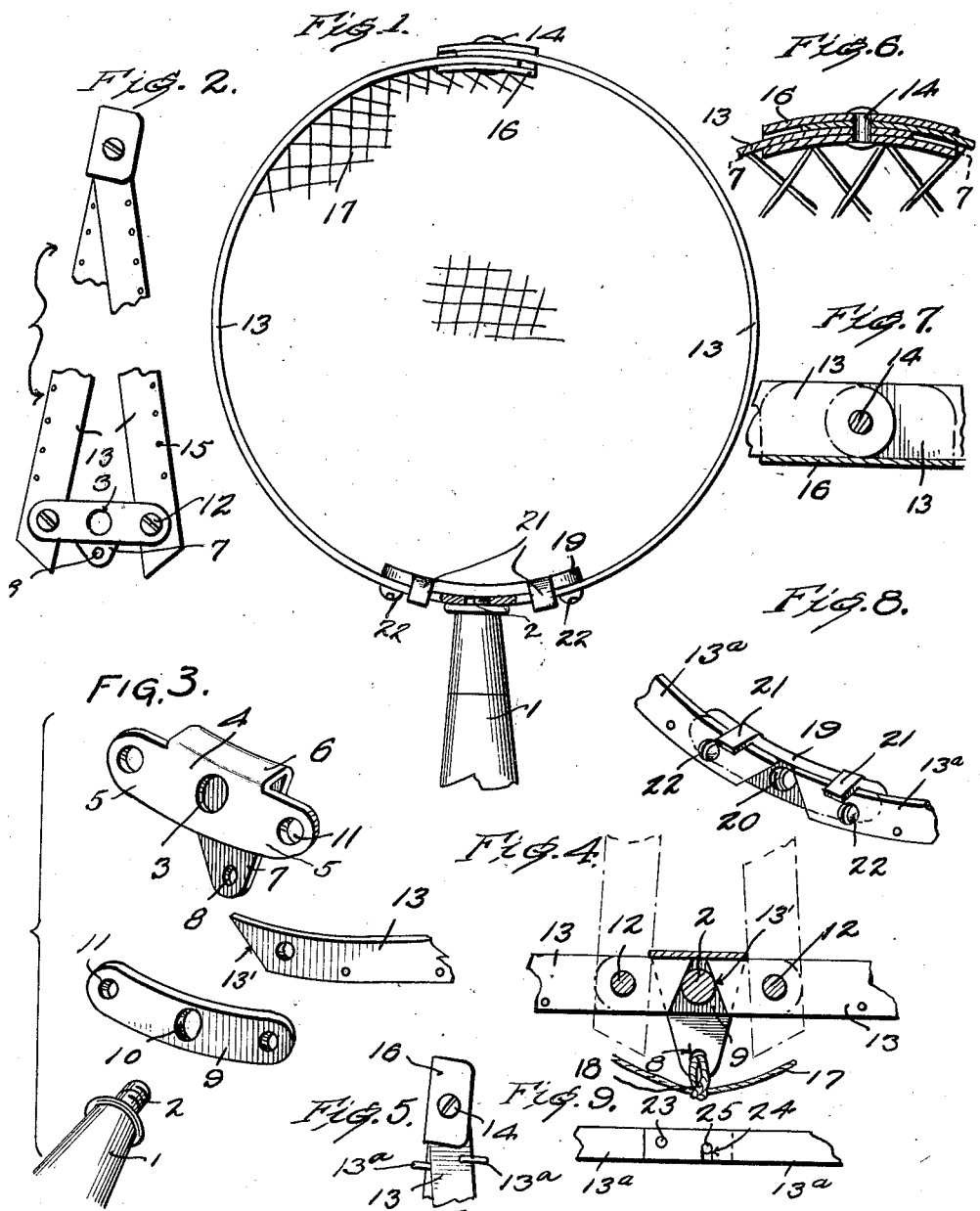
Witness
J. S. McCathan
James K. Dukas
INVENTOR.
BY
Richard B. Oliver
ATTORNEY.

Patented Sept. 26, 1922.

1,430,221

UNITED STATES PATENT OFFICE.

JAMES K. DUKAS, OF EDWARDSVILLE, PENNSYLVANIA.

FISHING NET.

Application filed August 10, 1920. Serial No. 402,525.

*To all whom it may concern:*

Be it known that I, JAMES K. DUKAS, a citizen of the United States, residing at 509 Main Street, Edwardsville, in the county of Luzerne and State of Pennsylvania, have invented certain new and useful Improvements in Fishing Nets, of which the following is a specification.

This invention relates to fishing nets and has for its object the production of a simple and efficient fishing net frame so constructed as to permit the same to be conveniently folded to occupy a minimum amount of space when not in use.

Another object of this invention is the production of a simple and efficient means for supporting the frame in an operative position through the medium of the supporting handle and ends of the frame hoops.

Other objects and advantages of the present invention will appear throughout the following specifications and claims.

In the drawing:—

Figure 1 is a top plan view of the net frame.

Figure 2 is a side elevation of a modified form such as is shown in Figures 3 and 4 showing the frame in a folded position, a portion thereof being broken away.

Figure 3 is a disassembled view of several portions of a modified form of the device comprising the handle receiving socket, one end of one of the hoops, the filler strip and a portion of the handle.

Figure 4 is a transverse sectional view of the modified form taken through the handle receiving socket showing the manner in which the handle co-operates with the respective ends of the hoops for holding the same in an operative position.

Figure 5 is a side elevation of one end of the frame, or the outer end thereof showing the position of the same when the same is in a folded position.

Figure 6 is a horizontal section through the outer end of the same when in an operative position.

Figure 7 is a section taken on line 7—7 of Figure 6.

Figure 8 is a perspective view of the preferred form as shown in Fig. 1 of the handle receiving socket and Figure 9 is a modified form of the method of connecting the outer ends of the hoops together.

By referring to the drawing it will be seen that 1 designates the handle which is provided with a threaded shank 2, which shank 2 is adapted to extend through the aperture 20 of the handle receiving plate 19. This handle receiving plate 19 is provided with a plurality of overhanging lips 21 which are adapted to overhang the upper edges of a hoop section 13 and limit the downward swinging movement thereof. The hoop sections 13ª are pivotally connected to the plate 19 by means of a pivot screw 22 as clearly shown in Figure 8.

In Figure 3 is shown a modified form of the invention wherein the several portions are shown in a disassembled view and the same comprises a handle 1 which is provided with a threaded shank 2, which shank 2 is adapted to extend through the aperture 3 of the handle receiving socket 4. This handle receiving socket 4 is provided with laterally extending ears 5 and an overhanging bridge portion 6, which bridge portion 6 terminates in a downwardly extending substantially V-shaped plate 7. An aperture 8 is located in the lower extremity of the V-shaped plate 7. A filler strip 9 is adapted to cooperate with the handle receiving socket 4 and this filler strip 9 is provided with a threaded aperture 10 for the purpose of receiving the threaded shank of the handle 1. Suitable apertures 11 are formed in the respective ends of the filler strip 9 and are adapted to register with the apertures 11 formed in the socket plate 4, for the purpose of receiving the pivot screws 12, these pivot screws 12 also passing through the respective inner ends of the hoop section 13.

The frame of the net comprises a pair of hoop sections 13 as clearly shown in Figure 1, and as previously stated the inner end of each hoop section 13 is pivotally mounted upon the pivot screw 12. The outer ends of these hoop sections 13 receive a rivet 14 for pivotally connecting the same together and these outer ends are mounted within a channel clip 16, which is substantially U-shaped in cross section as clearly illustrated in Figures 6 and 7. The body 17 of the net may be fastened by suitable lugs 13ª to the lower edge of the hoop sections 13 and by passing through the apertures 15 formed therein. In the modified form when it is desired to fold the net frame to a position for shipment or storage the handle 1 is removed by unscrewing the shank 2 from the aperture 10 and the hoop sections 13 may be swung toward each other which would cause the same to assume the position shown in Figure 2. By assuming this position the hoop sections 13 would change their relative position from a substantial semi-circular arrangement to flat converging strips as shown in Figure 2.

In the modified form the supporting strand 18 of the net 17 will be looped through the aperture 8 formed in the lower end of the substantially V-shaped plate 7. By considering Figure 4 it will be seen that the inner end of the hoop sections 13 are inclined as indicated at 13' and are adapted to bear against the shank 2 and in this way be held in a substantially horizontal position for the purpose of producing an efficient net supporting frame.

In Figure 9 there is shown a modified form of the manner of connecting the outer ends of the hoop sections 13ª which illustrates the pivotal connection 23, one of the hoop sections 13ª being provided with a notch 24 for the purpose of receiving a pin 25 carried by the opposite hoop section 13ª. This structure is used in place of the channel clip 16 shown in Figure 7.

It, of course, should be understood that certain detailed changes in the mechanical construction may be employed in the present invention without departing from the spirit thereof so long as these changes fall within the scope of the appended claims.

What is claimed is: —

1. A collapsible net frame comprising a plurality of hoop sections pivotally secured together at the outer ends, a handle receiving member, means for pivotally connecting the inner ends of said sections to said handle receiving member, the inner end of each section being inclined, a handle provided with a reduced shank adapted to engage said handle receiving member and fit between the inclined ends of said hoop sections for holding the same against swinging movement and means carried by said handle receiving member for engaging the hoop sections and prevent the swinging thereof in a downward direction.

2. A collapsible net frame comprising a plurality of hoop sections, means for pivotally connecting the outer ends of said sections together, a handle receiving socket member, means for pivotally connecting the inner ends of said hoop sections to said handle receiving socket member, said handle receiving socket member, provided with a plurality of overhanging lips adapted to overhang the hoop members for preventing the downward swinging movement thereof, each hoop member provided with an inclined inner end, a handle and shank adapted to engage said handle receiving member and fit between the inclined ends of said hoop members for preventing the upward swinging movement of said hoop members.

In testimony whereof I affix my signature in presence of two witnesses.

JAMES K. DUKAS.

Witnesses:
WM. I. WILLIAMS,
WM. L. MORGAN.